Patented Oct. 3, 1922.

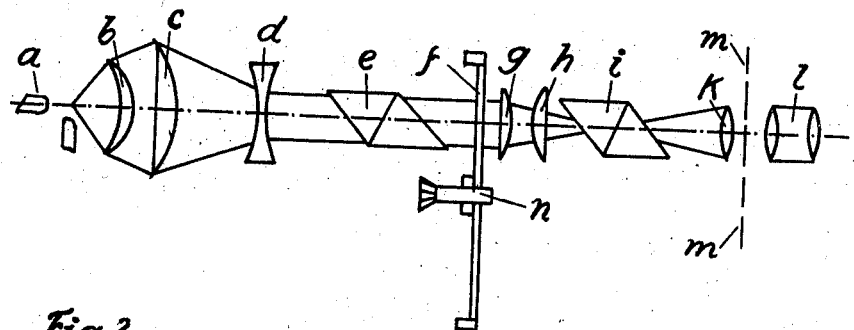
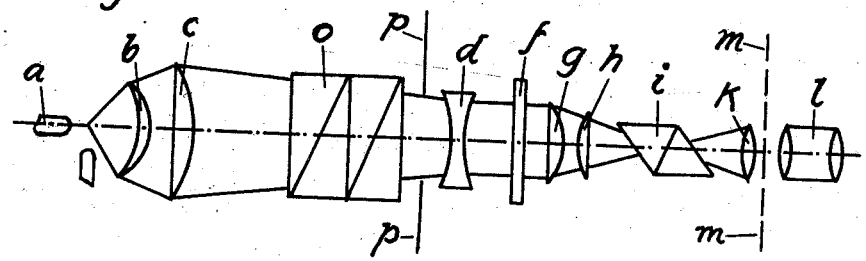
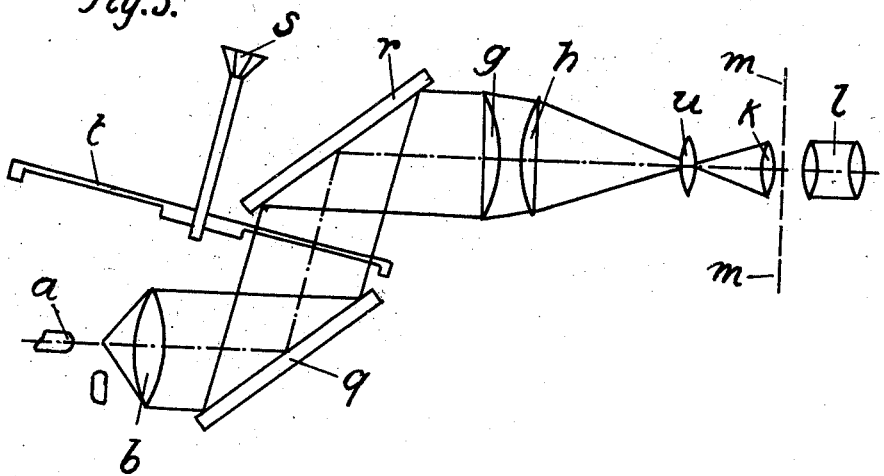

1,430,765

UNITED STATES PATENT OFFICE.

WILHELM SPÄTH, OF KIEL, GERMANY.

METHOD OF PRODUCING CINEMATOGRAPHIC PROJECTIONS IN NATURAL COLORS.

Application filed December 6, 1921. Serial No. 520,285.

*To all whom it may concern:*

Be it known that I, WILHELM SPÄTH, a citizen of the German Republic, residing at Kiel, Germany, have invented a certain Improved Method of Producing Cinematographic Projections in Natural Colors, (for which I have filed an application in Germany on December 1st, 1920,) of which the following is a specification.

The production of cinematographic projections in natural colors is usually effected by the employment of light-filters which enable two or more differently coloured pictures to be projected, simultaneously or successively, the blending of the pictures having to the eye, the effect of a naturally coloured picture. Light-filters in the form of coloured glass screens are used in the taking of the picture as well as in the projection of the same. It has also been suggested to produce coloured combination pictures spectroscopically by means of prisms and lenses.

According to the present invention the required division of white light into pencils of coloured rays is effected for cinematographic purposes by means of polarization.

It should be noted that the suggestion has already been made to utilize the polarization of light in the production of stereoscopic cinematographic pictures. In this case, however, coloured beams of light are combined to produce white light, whereas the present invention consists in polarizing the rays from a colourless film so as to produce a coloured projection.

The polarization effect lends itself admirably for the production, in a simple manner, of different, very pure and brilliant colors which are exactly complementary in character. Various optical means, such as the usual polarizing prisms or glass plate piles may be employed for effecting the polarization, but even the projecting screen may, according to known physical laws, be adapted to serve as a polarizer. The doubly-refracting or optically active element in the arrangement may consist of a known crystallic preparation for the function of which, however, can easily be delegated to the film itself.

For carrying the invention into effect various means may be employed of which a few are indicated diagrammatically in the accompanying drawings, Fig. 1 representing an arrangement in which the polarization is effected by means of ordinary Nicol prisms, Fig. 2, an arrangement containing a polarizer in the form of a Duboscq calcite prism, and Fig. 3, a view showing the employment of glass plate piles.

In Fig. 1 *a* is the light source; *b* and *c* represent the lenses of the condenser; *d* is a concave paralleling lens; *e*, the polarizer; *f*, a doubly-refracting plate; *g* and *h* are collecting lenses; and *i* is the analyser. By means of the lens *h* an image of the film picture *m* is formed in the objective *l* which projects it onto the screen. The color projected, say, when the prisms are crossed, depends on the thickness of the plate *f*, and the exact complementary color will be produced by turning the prisms so as to be parallel. Thus, when only two colors are required, these can be produced by turning either the polarizer or the analyser intermittently through an angle of 90° for each successive film picture. Any suitable mechanism may be employed for this purpose. If more than two primary colors are required, the plate *f* may be composed of a disc adapted to revolve about a shaft *n*, and the disc is fitted with a plurality, depending on the number of colors required, of attached doubly-refracting plates of correspondingly different thicknesses. In this case the polarizer and the analyser remain stationary either crossed or parallel. The first-mentioned arrangement has the advantage that the colors immerge one into the other without any definite line of demarcation, a fact which renders it very suitable for apparatus with continuously moving film and with optical rectification of the movement of the image.

The arrangement in Fig. 2 is like the one just described except that the polarizer consists of a Duboscq calcite prism. The paralleling lens *d* is arranged behind the polarizer with a stop *p* between the two.

In the arrangement according to Fig. 3 the polarizer and the analyser are composed of glass plate piles *q* and *r* respectively, and between them is arranged a disc *t* which revolves about a shaft *s*, the colors being produced by doubly-refracting plates of different thicknesses corresponding to different colors, the plates being connected to the disc. If, in the latter arrangement, the polarizer consists of a Nicol prism, the different colors can be produced by rotating the latter instead of the plate *t*.

The fact that colors of the most varied character can thus be produced by a simple mechanical movement renders the method particularly useful for making tests with a view to discover the most suitable color combination for film pictures of different characters.

I claim:—

1. A device for producing cinematographic pictures in natural colors, comprising a polariscope having a polarizer and an analyser arranged in the path of the projected light, translucent doubly-refracting plates of different thicknesses, and means for introducing such plates temporarily and successively between the polarizer and the analyser so as to resolve the white light into colored light and so as to produce complementary colors for successive pictures.

2. A device for producing cinematographic pictures in natural colors, comprising a polariscope having a polarizer and an analyser arranged in the path of the projected light, a revolving disc arranged between said polarizer and said analyser, and translucent doubly-refracting plates of different thicknesses connected to said disc so as to be successively interposed in the path of the light for resolving the white light into colored light and so as to change the colors into complementary ones for successive pictures.

Dr. WILHELM SPÄTH.